Patented Jan. 5, 1937

2,066,559

UNITED STATES PATENT OFFICE 2,066,559

DESTRUCTION OF COLOR-GENERATING SUBSTANCE IN RUBBER LATEX

John Edwardes, Melrose, Mass., assignor to Heveatex Corporation, Melrose, Mass., a corporation of Massachusetts No Drawing. Application May 19, 1934
Serial No. 726,577

3 Claims. (Cl. 18—50)

This invention relates to the destruction of color-generating substance in rubber latex either before such substance has had an opportunity of generating color in the latex or after it has so done; and, if it has so done, to the restoration of the latex to a color essentially that of the freshly tapped latex. It also relates to the resulting substantially color-stable latex.

Rubber latex when freshly tapped from such trees as the Hevea brasiliensis is characterized by milky whiteness. During storage or ageing, as in transit, it sometimes becomes discolored even though adequately preserved against putrefaction and coagulation with ammonia, the discoloration generally being a bluish cast. Indeed, the blue color is sometimes found to exist to such a decided degree in rubber latex imported from the Far East that the latex is considered unsatisfactory for some uses. I have evidence to the effect that this discoloration arises from the presence therein of a color-generating substance in the nature of an enzyme or ferment, wherefore, I shall hereinafter refer to such substance as an enzyme.

In accordance with the present invention, I destroy or poison such color-generating substance or enzyme as may be present in rubber latex either before or after color has been generated thereby in the latex. While there are various chemicals that may be used for this purpose, I work only with those that need be used in such small amount as to have inappreciable effect upon the useful properties of an ammonia-preserved rubber latex, the latex thus being maintained uncoagulated and otherwise unimpaired for its intended use. There are two classes of chemicals that I have found to be of utility in the practice of my invention. One class is effective both in poisoning the color-generating enzyme present in freshly tapped or undiscolored latex and in decolorizing aged or discolored latex as well as poisoning the color-generating enzyme present therein. This class of chemicals may hence be used either before the latex has gone off color, as at the rubber plantation, or after the latex has gone blue, as it may be when it is received by the importer or by the user. Typical of this class of chemicals are the soluble hypochlorites or chlorine. Another class of chemicals is effective essentially as a poisoner of the color-generating enzyme present in the latex and so may be used to good advantage at the rubber plantation in the treatment of latex in freshly tapped or undiscolored condition, in which case substantial color stability is realized in the latex. The soluble bisulphites, sulphur dioxide, hexyl resorcinol and potassium cyanide typify this latter class. The soluble bisulphites and sulphur dioxide are, however, preferred on account of their comparatively low cost.

I shall now give typical examples of procedure falling within the purview of the present invention, to wit:

Example I

About 0.3 parts by weight of sodium perborate is added to about 500 parts by weight of the ordinary ammonia-preserved latex of commerce that has been very blue as a result of ageing. The perborate, which may be added to the latex at room temperature, is preferably diffused uniformly throughout the latex by stirring. If considered advisable, the latex can be heated after treatment with the perborate to a temperature of 80° to 90° C., as such heating ensures a complete destruction of the enzyme so that there is no tendency for the blue color to recur in the latex.

Example II

About 0.1 to 0.2 parts by weight of sodium bisulphite is added to about 500 parts by weight of freshly tapped, ammonia-preserved rubber latex in the Far East. It is preferable that the sodium bisulphite be dissolved in a small amount of water before it is thoroughly mixed with the latex. As a result of such treatment, the enzyme present in the latex is poisoned; and there is no tendency for the latex to acquire a blue color even after months of standing.

Example III

About 5 parts by weight of commercial sodium hypochlorite solution is added to about 500 parts by weight of a "blue" rubber latex of the usual commercial variety. The hypochlorite solution may be mixed with the latex at room temperature. The latex is not only decolorized, but it remains decolorized without having undergone any heat treatment. Indeed, after keeping a sample of such treated latex under observation for six months, the sample is found to be substantially white in color and to give no indication whatever of the blue color returning. This means, of course, that the color-generating substance or enzyme to all intents and purposes destroyed or poisoned.

Example IV

About 0.1 to 0.2 parts by weight of sodium bisulphite is dissolved in a small amount of water and the resulting solution is added to and thoroughly mixed with 500 parts by weight of ammonia-preserved latex that has undergone treatment with sodium perborate as described in Example I but that has not been put through a heat treatment. As a result of such treatment with sodium bisulphite, the latex retains its milk-white color even after standing for several months.

It is possible to use other chemicals in place of those mentioned in the specific examples to accomplish the desired results. Thus, for decolorizing the latex, I may use such other chemicals as sodium peroxide, hydrogen peroxide, ammonium persulphate, and ammonium perchlorate, all of which are oxidizing agents. In the case of such oxidizing agents as sodium peroxide, hydrogen peroxide, ammonium persulphate, and ammonium perchlorate, however, there may be a tendency after a while for the blue color to recur in the latex, particularly when treatment with these agents has not been coupled with heating of the latex to a temperature of about 80° to 90° C. Accordingly, when these chemicals are added to the latex without putting the latex to a heat treatment, it is distinctly desirable to add any one of the enzyme-poisoners hereinbefore mentioned as being effective for the purpose of killing the enzyme and thus ensuring against the recurrence of the blue color in the latex. As already indicated, the hypochlorites, chlorine, the soluble bisulphites, sulphur dioxide, hexyl resorcinol, and potassium cyanide are effective enzyme-poisoners.

The various chemicals used in accordance with my invention, for instance, as disclosed in the foregoing specific examples, are effective when used in such small quantities as to be of comparatively insignificant expense and to exert no coagulating or otherwise objectionable effect upon the useful properties of the latex.

The principles of the present invention apply not only to rubber latices of normal or subnormal solids content, but also to latices that have been concentrated, as by so-called centrifuging or creaming operations to a supernormal solids content, as all of such latices are subject to discoloring tendencies on account of the presence therein of color-generating substance or enzyme.

I claim:—

1. A process of treating ammonia-preserved rubber latex that has gone blue as a result of the presence therein of color-generating enzyme, which comprises adding to the latex a chemical capable of liberating nascent oxygen in said latex and thereby decolorizing it but incapable of preventing the recurrence therein of the blue color; and adding thereto another non-oxidizing chemical incapable of decolorizing it but capable of poisoning the color-generating enzyme and thereby preventing the recurrence therein of the blue color; the amounts of said chemicals added having no appreciable effect upon the useful properties of the latex.

2. A process of treating rubber latex that has gone blue as a result of the presence therein of color-generating enzyme, which comprises adding to the latex a chemical capable of liberating nascent oxygen in said latex and thereby decolorizing it but incapable of preventing the recurrence therein of the blue color; and adding thereto sodium bisulphite to poison the color-generating enzyme and thereby to prevent the recurrence therein of the blue color; the amount of said chemical and said sodium bisulphite added having no appreciable effect upon the useful properties of the latex.

3. A process of treating rubber latex that has gone blue as the result of the presence therein of color-generating enzyme, which comprises adding to the latex sodium perborate to liberate nascent oxygen in said latex and thereby to decolorize it at least temporarily; and adding thereto sodium bisulphite to poison the color-generating enzyme and thereby to prevent the recurrence therein of the blue color; the amounts of said sodium perborate and sodium bisulphite added having no appreciable effect upon the useful properties of the latex.

JOHN EDWARDES.